Jan. 28, 1941. W. A. WEIGHTMAN 2,229,993
PRESS WELDING MACHINE AND METHOD
Filed May 19, 1937 6 Sheets-Sheet 1
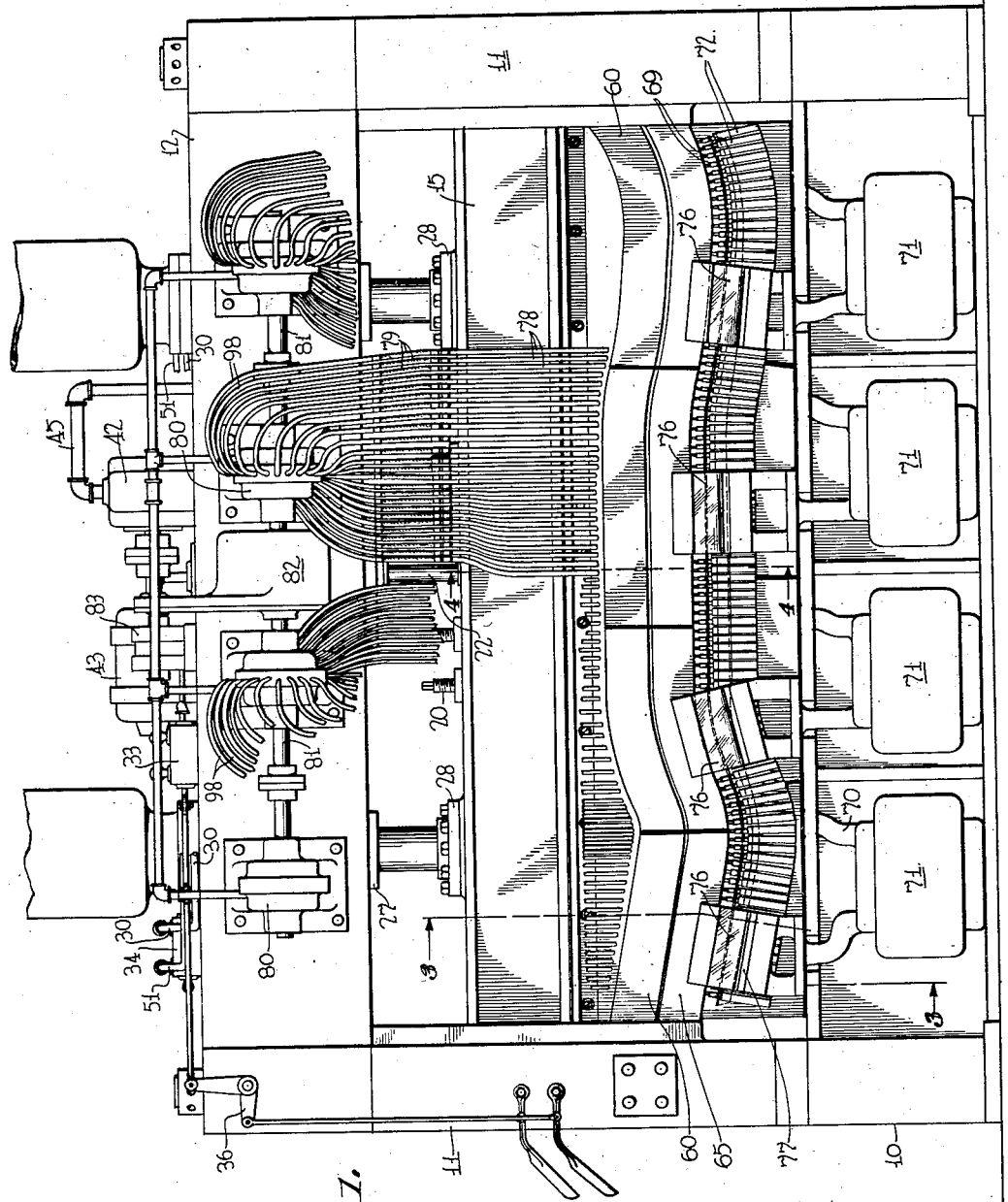
Fig.1.
INVENTOR.
William A. Weightman
BY 
ATTORNEY.

Jan. 28, 1941.  W. A. WEIGHTMAN  2,229,993
PRESS WELDING MACHINE AND METHOD
Filed May 19, 1937  6 Sheets-Sheet 2
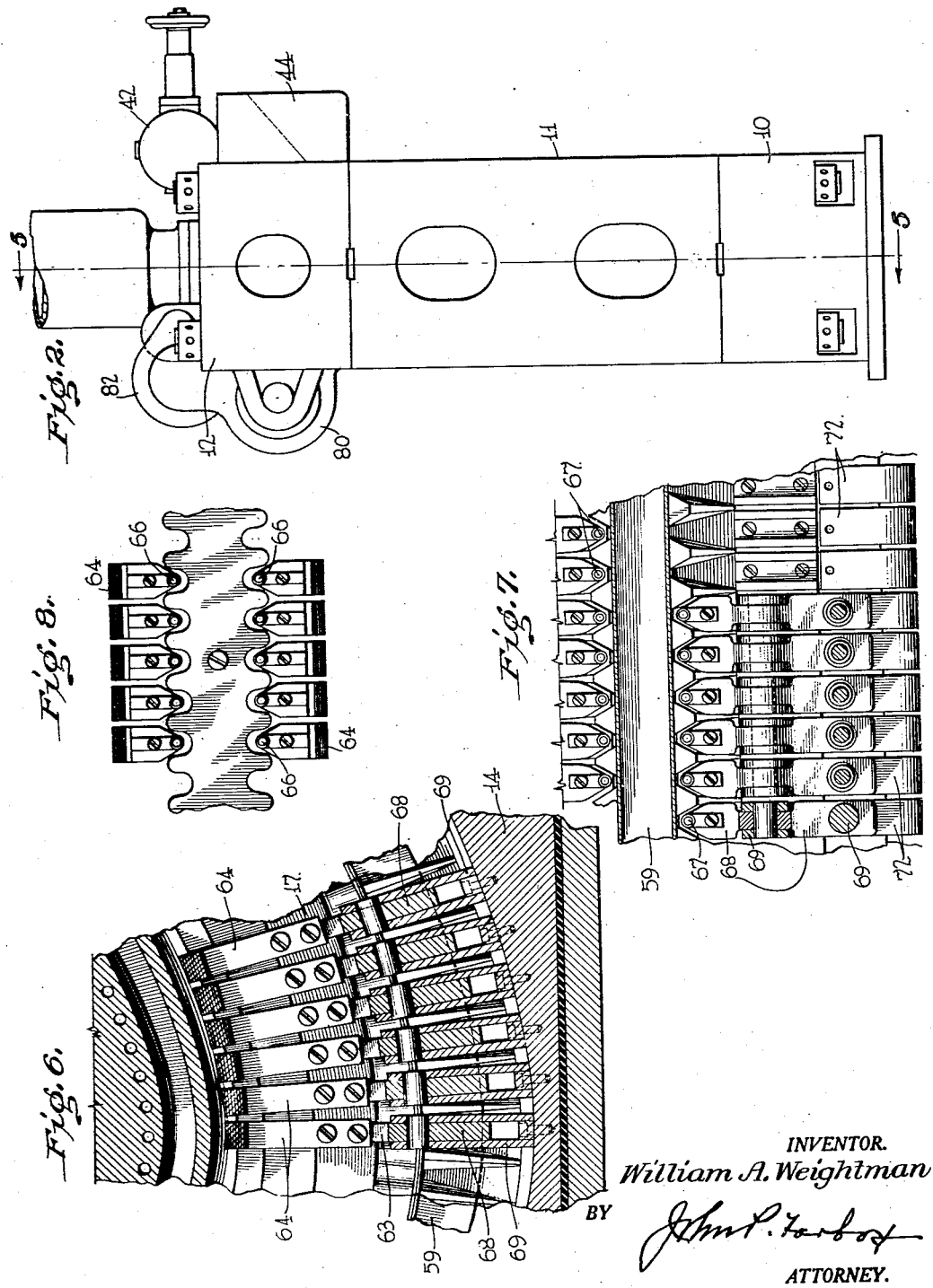
INVENTOR.
William A. Weightman
BY
ATTORNEY.

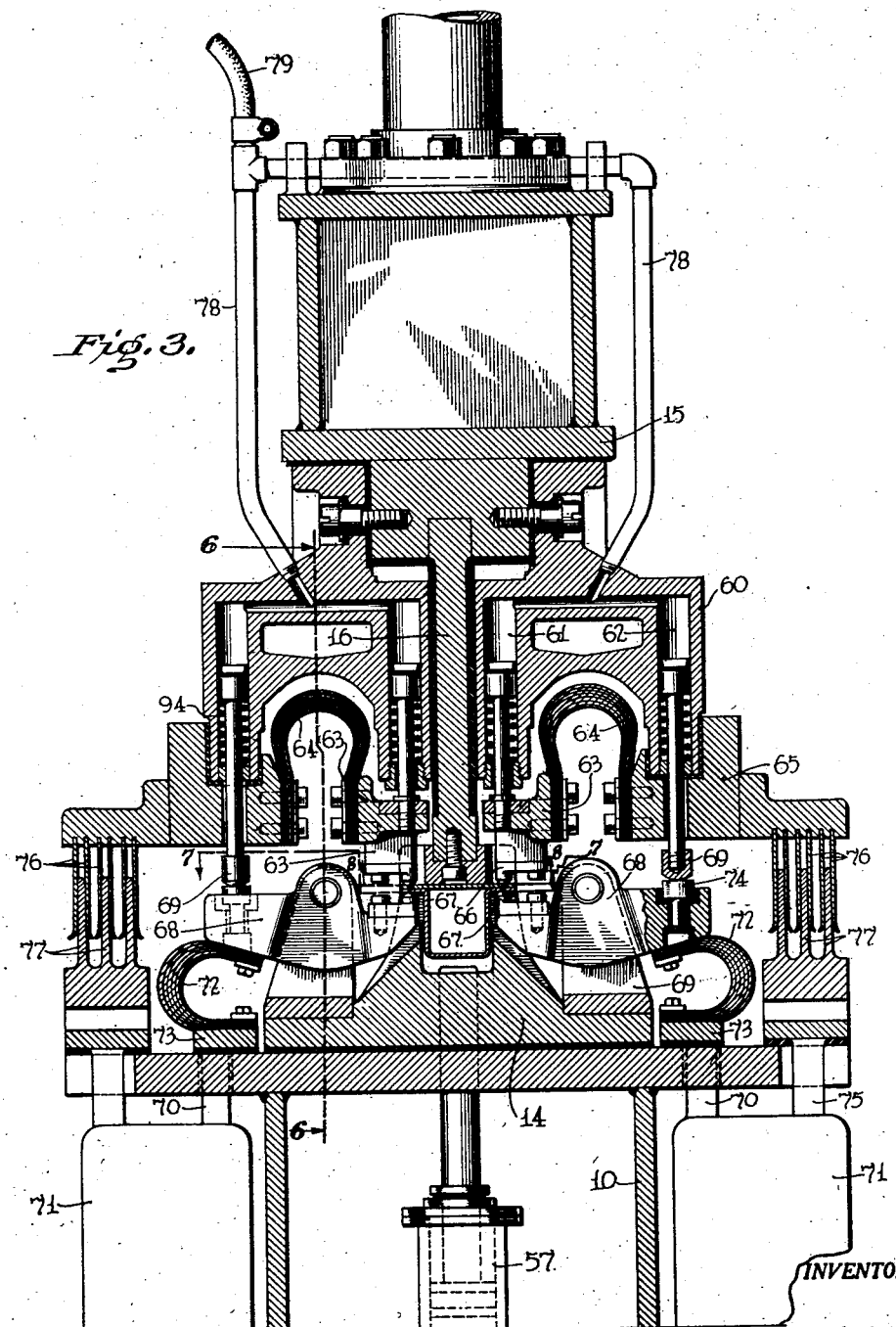

Jan. 28, 1941.    W. A. WEIGHTMAN    2,229,993
PRESS WELDING MACHINE AND METHOD
Filed May 19, 1937    6 Sheets-Sheet 4
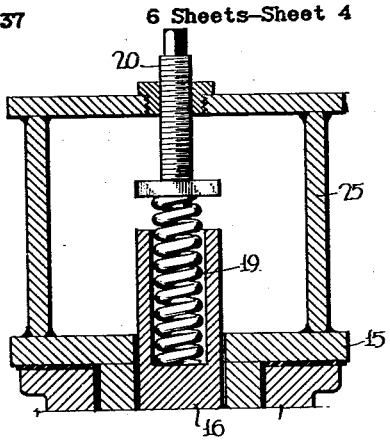
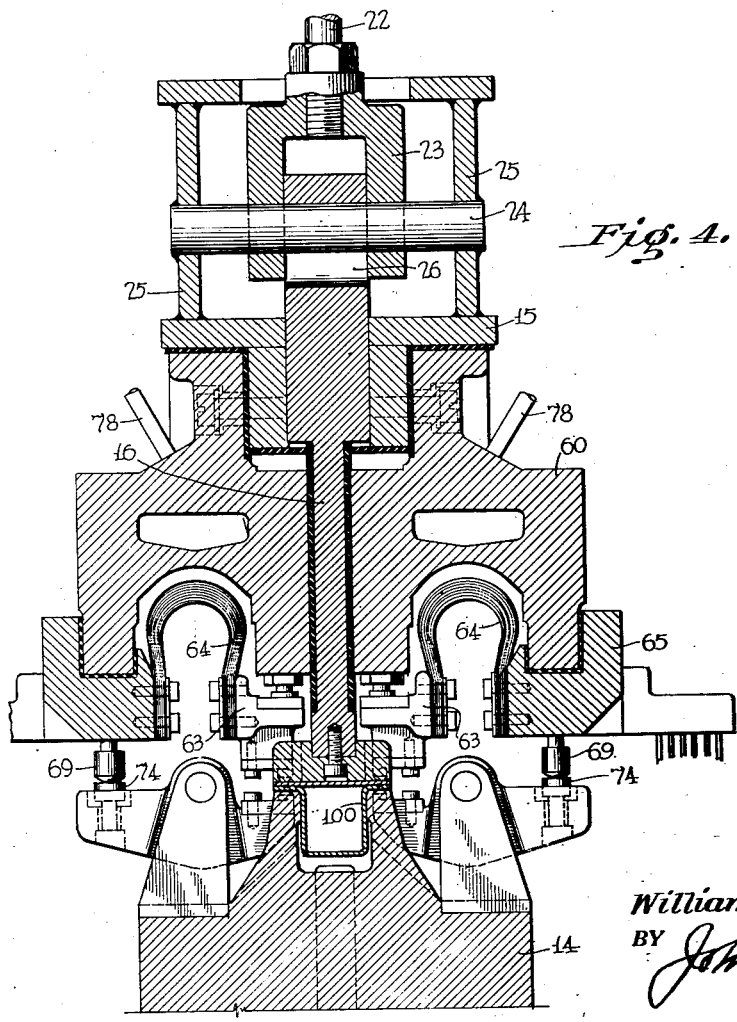
INVENTOR.
William A. Weightman
BY
ATTORNEY.

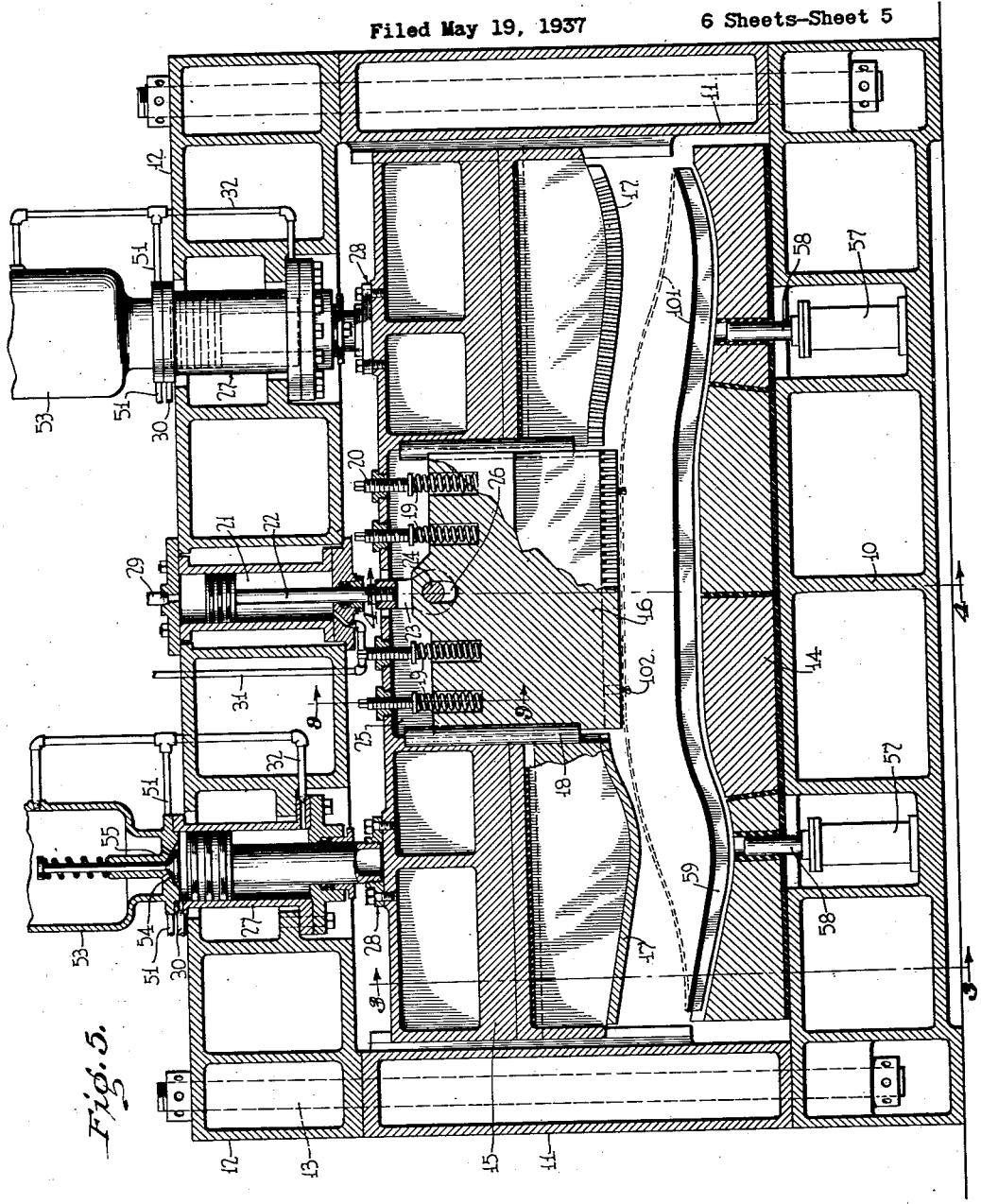

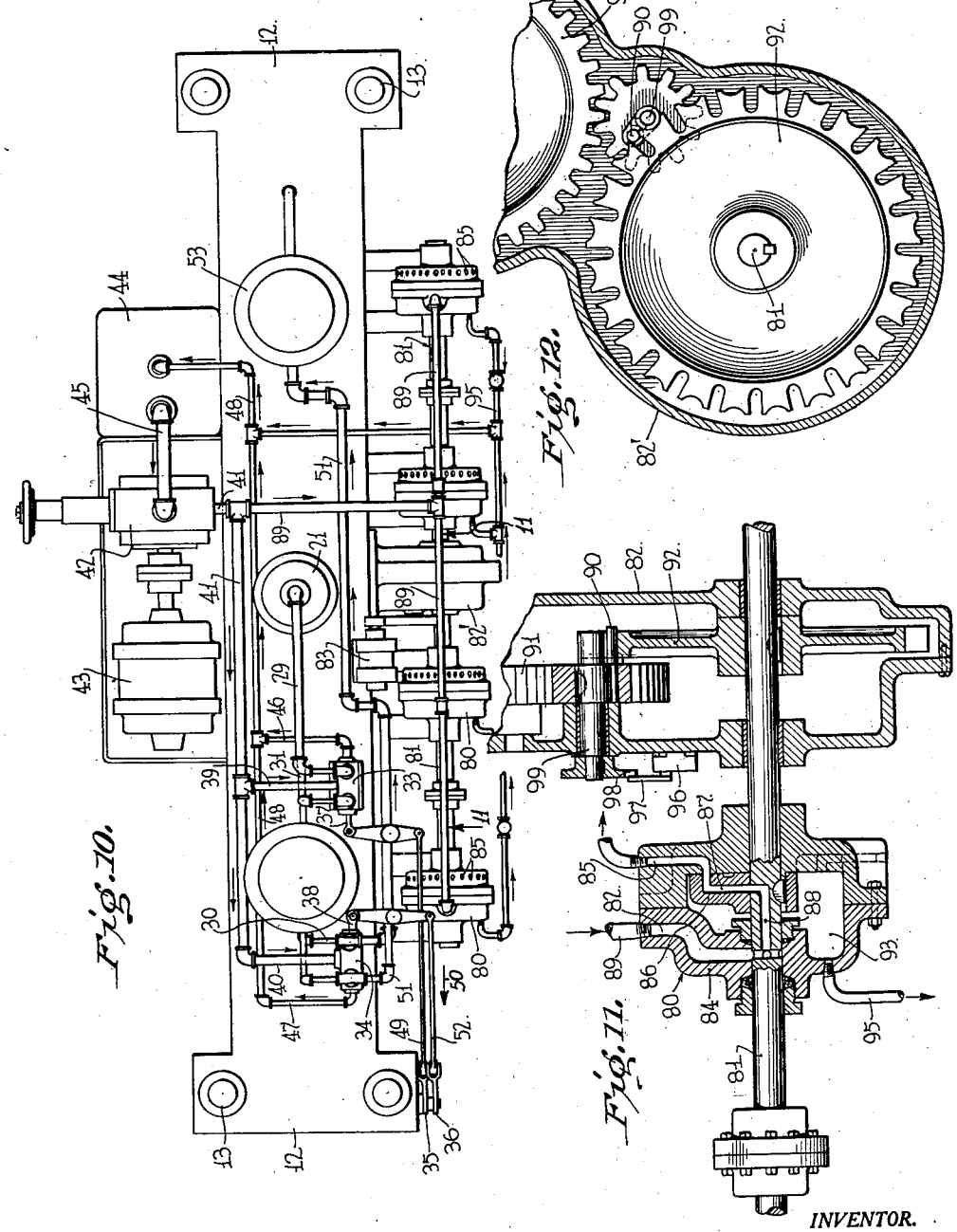

Patented Jan. 28, 1941

2,229,993

UNITED STATES PATENT OFFICE 2,229,993

PRESS WELDING MACHINE AND METHOD

William A. Weightman, Philadelphia, Pa., assignor to Edward G. Budd Manufacturing Company, Philadelphia, Pa., a corporation of Pennsylvania Application May 19, 1937, Serial No. 143,600

20 Claims. (Cl. 219—4)

The present invention relates in general to the production of sheet metal box section beam or column elements and in particular to a method for the quantity production of sheet metal box section beams and to apparatus adapted to the carrying out of such method.

An important object of the invention is to provide a method and apparatus for the quantity production of heavy gauge sheet metal, box section beams with a high degree of accuracy of shape and dimension.

Another object is the provision of a method and apparatus for the rapid production in quantity of beams of the above qualifications by spot welding and with a uniform high degree of strength of the spot welds throughout the length of the beam.

Various other objects and advantages of the invention will become apparent from a perusal of the following specification and the drawings accompanying the same.

In the drawings:

Fig. 1 is a front elevation of my improved machine.

Fig. 2 is an end view looking from the right in Fig. 1.

Fig. 3 is a vertical transverse section taken on the line 3—3 of Fig. 1, and Fig. 5.

Fig. 4 is a fragmentary vertical transverse section taken on the line 4—4 of Fig. 1 and Fig. 5.

Fig. 5 is a longitudinal section taken on the line 5—5 of Fig. 2.

Fig. 6 is a fragmentary longitudinal section taken on the line 6—6 of Fig. 3.

Fig. 7 is a fragmentary plan view, partly in section on the line 7—7 of Fig. 3.

Fig. 8 is a bottom fragmentary plan view partly in section on the line 8—8 of Fig. 3.

Fig. 9 is a fragmentary detail on an enlarged scale taken on the line 9—9 of Fig. 5.

Fig. 10 is a top plan view of Fig. 1.

Fig. 11 is a fragmentary detailed section on an enlarged scale taken on the line 11—11 of Fig. 10.

Fig. 12 is an enlarged detailed view of the Geneva top control for the distributing valve.

Referring to the drawings in detail, the machine comprises the base or bed portion 10 having side columns 11 supporting the crown member 12 secured together by suitable die rods 13. Mounted upon the base member and suitably insulated therefrom is a die or work holder 14 formed in four sections insulated from each other while slidably mounted on the side columns by means of suitable gibs is a ram member 15 which carries a central pressure clamp 16 and end clamps 17. The clamp member 16 is mounted on the ram member 15 for relative movement with respect thereto through suitable gibs 18 (Fig. 5) and resiliently held in its normal position by means of compression coil springs 19 and spring adjusting screws 20.

The ram member 15 is arranged to be moved as a whole toward and away from the die member 14 by means of a high speed hydraulic motor element 21, the motor being connected with the ram member by means of the piston rod 22 and end clevis 23 connecting with transverse pin 24 fixed to the ram member 15 through connection with the side walls 25 in the central portion of the ram member. The pin 24 also connects with the central clamp member 16 through an elongated slot 26, the pin 24 normally engaging the upper end of the slot in the raised position of the ram member as shown in Fig. 5, in which position the parts are held under tension of the compression springs 19.

For applying the maximum desired pressure after first the central clamp member and then the end clamp members 17 have engaged the work under pressure exerted by the fast moving motor element 21, a pair of relatively high power hydraulic motor elements 27 are provided whose piston rods are directly connected with the upper portion of the ram member 15 through suitable flange connections 28. Operating connection with the opposite ends of the several motor elements is effected through suitable pipe connections 29, 30, 31 and 32, the separate connections of which are controlled by means of control slide valves 33 and 34 (Fig. 10). Control of the slide valves 33 and 34 is afforded by means of conveniently positioned hand-operated levers 35 and 36 through suitable linkage connecting them with the valve plungers 37 and 38 respectively as clearly shown in Fig. 10. The four-way slide valves 33 and 34 have their inlet fluid supply ports connected through pipes 39 and 40 respectively through a supply line 41 to a suitable source of fluid pressure such as a fluid pressure pump 42 driven by an electric motor 43. The pump 42 is of the constant pressure valve displacement type arranged to supply fluid under constant pressure to the supply line 41 from a suitable sump tank 44 through a pump inlet connection 45. The four-way valves 33 and 34 are provided with exhaust connections 46 and 47 respectively leading through the exhaust line 48 to the sump tank 44.

The valve 33 is so arranged that upon movement of the connecting rod 49 (Fig. 10) to the left, in the direction of the arrow 50, the conduit 29 leading to the upper chamber of the hydraulic motor element 21 will be connected through pipe 39 to the supply line 41 while the conduit 31 leading from the lower end of the motor 21 will be connected through the exhaust branch 46 to the exhaust line 48, and vice versa.

Similarly, the valve 34 is arranged so that upon movement of the connecting rod 52, the branch conduits 30 leading to the upper chambers of the motor elements 27 will be connected to the fluid supply line 41 while the branch conduits 51 leading to the lower chambers of the motors 27 will be connected through the conduit 47 to the exhaust conduit 48. The operation of the valve 34 differs slightly from that of the valve 33 in that when the connecting rod 52 is moved to the right (Fig. 10), the branch conduits 30 leading to the upper chambers of the motors 27 are connected through branch 47 to exhaust line 48 while the connection of conduit 51 through the valve is closed so as to leave the lower chambers of motors 27 connected only to their respective surge tanks 53. In order to permit connection of the surge tank with the top chambers of the motor elements 27 only during downward movement of their pistons, such surge tanks are connected at their bottoms through suitable ports 54 with the said top chambers, which ports are controlled by a mushroom valve 55 normally held in the upper closed position as shown in Fig. 5 by the compression valve spring 56.

The work, which in the present case is a chassis side member for an automobile in the form of a flanged channel member with a cover strip, is supported in the die or work holder 14 which is arranged to hold the work fixed against a change in shape and dimension. This holding of the beam or chassis member in predetermined form is assured by forming the inside bearing faces or surfaces of the die or holder 14 to the desired outer contour of the channel element which previous to being placed in the machine is formed with a slight outward flare to its side walls so that when forced into the die or holder 14, the side walls will be sprung into the desired shape. While the machine may be used in the formation of box section beams of various shapes and from different gauge metal, the present embodiment is particularly adapted to the formation of such beams from relatively heavy gauge material, for example, a gauge of .093 for the channel member and .060 for the cover member. Because the work is forced into the die or work holder under considerable pressure, it is desirable that means be provided for readily ejecting the work from the holder after the welding operation is completed and such means are here furnished in the form of suitable work ejectors 57 arranged to force their plungers 58 upwardly through the body of the die 14 to eject the work piece 59. The plungers 58 are suitably insulated from the end dies through which they pass by means of insulating bushings as shown. It is not necessary to insulate the tops of the plungers inasmuch as they are in contact with the work only after the welding is completed and during the ejecting of the work.

Mounted on either side of the ram member 15 for movement therewith is a group of four cylinder blocks 60 each block containing a multiplicity of electrode operating cylinders arranged in pairs of inner and outer motor cylinders 61 and 62 respectively. The inner work cylinders 61 are arranged to move upper electrode holders 63 to and away from the work piece, said electrode holders being electrically connected through flexible braid members 64 to a bus bar element 65 common to one of the cylinder blocks 60 for supplying current to all of the electrode holders 63 of that block. The electrode holders 63 each carry an electrode tip 66 for engagement with the upper surface of the work.

The lower electrode tips 67 for engagement with the lower surface of the work are carried by electrode rocker arms 68 pivotally mounted in the brackets 69 mounted on the lower portion of the work holder. Electrical connection from the rocker arms 68 to one terminal 70 of their associated transformer 71 is effected through flexible braid connectors 72 and the associated common bus bar 73. Movement is applied to the rocker arms 68 by individual plunger elements 69 operated by the outer work cylinders 62. To complete insulation of the electrodes and electrode holders from the walls of the operating cylinders, the piston rods are insulated from the framework of such cylinders by suitable insulating bushings as shown, the pistons being insulated by forming them of an insulating material in the nature of a reinforced phenol condensation product. In the case of the outer work cylinders, 62, the piston rod is air insulated through the bus bar 65 through which they pass by suitable clearance, the bus bar 65 in turn being insulated from the cylinder block 60 by suitable intervening insulation as shown in Fig. 3. The rocker arms 68 are insulated from their operating plungers 69 by means of suitable insulating bushings between the plungers 69 and their respective wear pins 74. Electrical connection is effected between the bus bar 65 and the other terminal 75 of its associated transformer 71 through upper and lower knife switch contacts 76 and 77 respectively, the lower contacts 77 being mounted on the base of the machine and insulated therefrom while the upper contacts 76 are carried by the bus bar 65 for movement therewith into and out of engagement with the lower contacts upon downward and upward movement of the piston block 60 with the ram member 15. Thus by use of the separable connection afforded by the switching contacts 76—77 and the separable motion transmitting means between the rocker arms 68 and their motor cylinders 62 afforded by the plungers 69 and wear pins 74 ample unobstructed clearance is obtained from the work holder to the outer sides of the machine affording ready access to the work holder for loading and unloading of the machines from the sides.

Operating fluid is supplied to the electrode motor elements 61 and 62 through conduits 78, one set of such conduits for two pairs of motor elements 61 and 62 situated one pair on each side of the upper clamp member in a common transverse plane for simultaneous operation of the two pairs of electrode tips in such plane on opposite sides of the work piece. Each set of conduits 78 are connected to a common flexible feed conduit 79 of insulating material such as high pressure rubber hose, for the purpose of effecting a flexible connection between the movable ram member 15 and a distributing valve 80 rigidly mounted on the crown of the machine, there being four such distributing valves on each side of the machine, one for each pair of oppositely positioned cylinder blocks 60.

The several distributing valves 80 are arranged to be driven by a common shaft 81 in turn driven through a gear box 82' from a suitable electric motor 83. Each distributing valve comprises a casing 84 having a multiplicity of outlet or distributing ports 85 equally spaced about the periphery of the casing 84 and to which ports are connected the conduits 79. Fluid under pressure is supplied to the series of ports 85 by means of the rotary distributing arm 86 carried by the shaft 81. Fluid connection through the distributing arm 86, shaft 81, and inlet port 82 in casing 84 is provided by means of a suitable duct 87 in the distributing arm connecting through a central duct 88 in the shaft which in turn connects with the inlet duct 82 in the casing 84. The inlet duct 82 is supplied with fluid under pressure through a supply pipe 89 connected with the supply line 41 leading from the outlet port of the pump 42.

The gear box 82' houses a Geneva gear arrangement comprising a Geneva pin wheel 90 (Fig. 12) driven by suitable reduction gears 91 from the motor 83 and arranged to effect intermittent stop motion of the shaft 81 through the Geneva star wheel 92. The distributing valves 80 are thus operated to quickly connect and disconnect the supply pipes 85 leading therefrom, to and from the fluid pressure supply in seriatim, with a predetermined pause between each movement.

Each of the distributing valves is also provided with an exhaust chamber 93 normally open to all the ports 85 except during connection of that port with the pressure fluid supply by the distributing arm 86, so that when fluid pressure is removed from each of the motor elements 61 and 62 due to movement of the distributing arm beyond its corresponding port in the distributing valve, the operating piston will be forced back into the cylinder by its associated return spring 94 displacing the fluid from the cylinder back through the conduits 78 and 79 and port 85 of the distributing valve into the exhaust chamber 93 and thence out through the exhaust conduit 95 to the exhaust line 48 into sump tank 44.

For controlling the supply of power to the primary of the transformer in proper timed relation to the intermittent motion of the distributing valves 80 and consequently in timed relation to the mechanical operation of the electrodes as well as for proper timing of the welding cycle, a control switch 96 is provided. This switch is mounted on the gear casing 82' and provided with an actuating arm 97 arranged to be engaged by a cam 98 carried by the shaft 99 of the Geneva pin wheel 90 for closing and opening the power supply circuit within the period of time covered by the pauses intermediate the intermittent movements of the distributing valve. Such switch 96 may effect such control either directly or through the intermediation of a suitable circuit timing mechanism.

In operation, assuming the several parts to be in the normal position as shown in Fig. 5, with the ram member 15 in the raised position, the work 59 which in the persent instance is the channel member of a box section beam shaped to form the side member of an automobile chassis, is placed in the die or work holder 14 in the position shown. Because of the outward flare of the channel member, as previously described, and other deviations from the desired shape, it does not drop into nesting engagement with the work holder but is held near the top thereof. The cover element 101 is then temporarily secured at its central portion to the central pressure clamp 16 by means of the spring pins 102 rigidly fastened to the clamp member 16 and arranged to pass through suitable holes in the cover plate 101 and hold the same thereon in friction engagement therewith in any known or other suitable manner, to hold the cover element 101 in the position shown in dotted lines. The cover strip being thus positioned above the channel member and in line therewith, one of the operating levers 35 (Fig. 10) is pulled downwardly to pull the rod 49 to the left which in turn moves the plunger 37 of valve 33 into position to connect the fluid pressure supply line 41 through conduit 39 and valve 33 to conduit 29 leading to the upper chamber of the motor element 21. Operating fluid under pressure, now entering the upper chamber of the motor element 21, forces the piston rod 22 and with it the ram member 15 downwardly toward the work piece carrying the cover element 101 down onto the work piece 59, whereupon, the central pressure clamp 16 first comes into play clamping the cover strip against the work piece after which the ram member 15 continuing its downward movement, pushing the cover plate and work piece down into the work holding die thereby conforming the work to the proper shape and dimensions and clamping the center portion of the cover plate to the top of the work piece. The continued downward movement of the ram 15 then brings the end holding clamps 17 into clamping engagement with the cover strip. At the same time, compression springs 19 exert and maintain additional pressure on the central portion of the cover element and work piece. During downward movement of the ram member 15 by the high speed motor element 21, such movement is rendered free of retardation by the high power cylinders 27 by means of the valve controlled connection between the bottom of surge tank 53 and the top chamber of cylinder 27, and the exhaust connection with the lower chamber through the conduit 32, the mushroom valve 55 opening under the force of low suction created in the upper chamber of the motor element 27 permitting fluid to flow from the surge tank 53 into the upper chamber through the valve ports 54. To exert the final maximum pressure on the cover strip against the work piece, the operating lever 36 is pulled down, pulling connecting rod 52 to the left which, in turn, moves the valve plunger 38 of valve 34 in a direction to admit fluid from the pressure line 41 through the valve 34 and conduits 30 to the upper end of motors 27, thus admitting pressure to the upper chambers therein. The pressure thus created in the upper chamber of the motor element 27 seats the mushroom valve 50 upwardly against the ports 54 closing the connection between the upper chamber and the surge tank, and applies the maximum pressure on the work against the work holder.

The work being thus clamped in proper position for welding, the motor 83 is started, starting operation of the distributor valve 80 from a given normal position in advance of the first outlet distributing port 85 to which is connected the conduit 78 leading to the first transverse set of motor elements in each piston block 60. The distributor valves then proceed automatically to effect operation of the motor elements of the various cylinder blocks 60 in seriatim causing the respective electrode tips to engage the work piece for the production of the spot weld between the outer marginal edges of the cover strip and the flanges of the channel element. Due to the intermittent movement of the distributor valve, the proper working pressure is rapidly built up and maintained uniform during the weld interval. Thus eight welds are made simultaneously each supplied by the transformer 71 of its group of which there are four, one for each cylinder block 60. Thus the full power of each transformer is supplied to one pair of upper and lower electrode points during their welding cycle. After the welding current is cut off, the valve effects a quick release of the group of electrodes just operated and a quick operation of the next succeeding group. After the distributing valve has completed its cycle of movements and returned to the normal zero position, the motor 83 is stopped after which both operating levers 35 and 36 are moved upwardly. Upward movement of both the operating levers moves the connecting rods 49 and 52 to the right which, in turn, operates the valves 33 and 34 to reverse the connections of the supply line and exhaust line with the rapid traverse motor element 21, at the same time switching the connection of conduits 30 from the supply line. Pressure fluid now entering the lower chamber of the motor element 21 forces the piston upwardly carrying with it the piston rod 22 and ram member 15 into the uppermost position as shown in Fig. 5. During upward movement of the ram member, exhaust fluid passes out of the upper chamber of the work cylinder 21 to the sump tank 44 by way of conduit 29, valve 33 and conduits 46 and 48. This upward movement of the ram member is relieved of retardation by cylinders 27 by virtue of the fact that their upper chambers are in free communication with the sump tank 44 through conduits 30, valve 34 and conduits 47 and 48. Upward movement of the ram member carrying with it the plunger head 69 and knife switch element 76 leaves ample clearance from the center of the machine to both sides for ready removal of the finished work piece. The work piece is now ejected from the work holder by operation of ejectors 57 which push their plungers 58 up through the end sections of the work holders to eject the work clear thereof. The work is now removed from the side of the machine after which the operation above described may be repeated on another work piece.

While I have shown and described a preferred embodiment of my invention for the sake of disclosure, it is to be understood that it is not limited to such specific embodiment but contemplates all such variations and modifications thereof as fall fairly within the scope of the appended claims.

What I claim is:

1. In a welding machine, a work holder, a pair of opposing complementary spot welding electrodes arranged to engage at opposite sides a portion of a work piece held by said holder, means situated on one of said sides of the work piece for moving said electrodes into clamping engagement with the work piece independently of each other in opposite directions and under substantially equal clamping pressure, and separable motion-transmitting means connecting said moving means with the electrode on the side of the work piece opposite said moving means, separable to permit separation of the electrodes beyond their limit of movement by said moving means.

2. In a welding machine, a work holder arranged to receive and hold a channel section beam, means for applying a cover strip to the beam under pressure first near the center of the beam and then from the center to the ends, and means for spot welding the cover strip to the beam from end to end.

3. In a welding machine, a work bed, a work holder mounted on said bed arranged to hold a flanged channel beam in upwardly facing position, a movable head member arranged to move toward and away from said work holder, a middle clamping member carried by said head for movement into clamping engagement with the middle portion of a cover strip laid upon the open side of a flanged channel beam held in the work holder, end clamping members carried by said head for movement into clamping engagement with the end portions of the said cover strip, and a pair of welding electrodes arranged to be moved into operative relation with a flange on the beam and a portion of the cover strip overlapping the flange for welding the two together.

4. In a welding machine, a work bed, a work support, a movable head member arranged to move toward and away from a piece of work supported by said work support, a clamping member carried by said head for movement into clamping engagement with a work piece supported by said work support, a welding electrode supported wholly by said head arranged for engagement with the work piece on the side toward the head, a second welding electrode supported independently of the head and arranged for engagement with the work piece on the side toward the work bed, a source of welding current supply arranged in close proximity to the said second electrode, and a pair of switching contacts carried, one by said head and one by said work bed for connecting the first mentioned electrode with the said source.

5. In a hydromatic welding machine, a plurality of welding electrodes and hydraulic motors therefor, a distributing valve having distributing ports and operable in different positions to open and close a distributing port connecting a source of working fluid to different said motors, means for intermittently moving said valve from one position to another to quickly connect and disconnect a source of working fluid to and from said different motors, a source of current, means controlling the connection of said source with said electrodes, and means for actuating said control means intermediate the intermittent movement of said distributing valve.

6. In a press welding machine, a work bed, a work holder mounted on said work bed, a superstructure comprising a crown member mounted above said work bed and supports for the crown extending between the crown and work bed and situated at opposite ends of the work bed leaving a loading and unloading clearance across the work bed from side to side of the machine between the crown and work bed, a ram member supported on part of said superstructure for movement toward and away from the work bed across said clearance, an upper welding electrode carried by said ram for movement toward and away from the work piece, a lower welding electrode mounted on said work bed below said clearance space, pressure applying means for each electrode carried by said ram, separable motion transmitting means connecting one of said pressure applying means with said lower electrode across said clearance, a transformer in close proximity to said lower electrode, a short permanent electrical connection extending from one terminal of the transformer to the lower electrode, a switch element mounted on the work bed connected to and in close proximity to the other terminal of the transformer below said clearance, and a second switch element in close proximity to and electrically connected by said ram for movement therewith into and out of circuit connecting relation with said first mentioned switching element across said clearance.

7. In a welding machine, a work holder, a movable member mounted above the work holder for movement toward and away from said work holder, an upper electrode carried by said movable member, means carried by said movable member for moving said electrode relative to said movable member, a lower electrode carried by said work holder arranged for movement relative to the work holder, electrode operating means for said lower electrode carried by said movable member, and means carried by said movable member for transmitting motion from said electrode operating means to said lower electrode.

8. In a welding machine, a plurality of electrodes and hydraulic motors therefor, a distributing valve having distributing ports and operable in different positions to open and close a distributing port connecting a source of working fluid to different said motors, means for rapidly moving said valve from one position to another to quickly connect and disconnect the source of working fluid to and from different motors with a predetermined pause between each movement, a power supply circuit for the electrodes, and means for closing and opening said circuit within the period of time covered by said pauses.

9. In a welding machine, a work holder having side and flange engaging members arranged to engage the sides and flanges of an outwardly flanged channel section beam, a top clamping platen movable for clamping a cover strip over the face of the channel section beam against the flanges of the beam, an electrode support movable with the top clamping platen, spot welding electrodes mounted on said support for movement through openings in said top platen into and out of operative engagement with the cover strip at points opposite the beam flange, other spot welding electrodes mounted on said work holder for movement through openings in said side and flange engaging members into and out of operative engagement with the beam flanges at points opposite the points of engagement of said first mentioned electrodes, separable motion-transmitting means carried partly by the electrode support and partly by the work holder for transmitting movement to said other electrodes and motor means carried by said electrode support for moving both said first mentioned electrodes and the part of said separable means carried by said electrode support.

10. The method of spot welding a flat strip cover sheet onto the open flanged side of a flanged channel beam which comprises holding the beam against change of form and position, laying the cover sheet upon the flanges of the channel beam along the beam and across the open side of the channel, clamping the cover plate to the beam first at the middle portion and then at the two end portions, and spot welding the side marginal edges of the cover sheet to the flanges while so clamped.

11. The method of spot welding a cover plate onto the open side of a channel beam having laterally outwardly extending flanges along the edges of its side walls which comprises first clamping the cover plate at its middle portion and then at its end portions to the open side of the channel beam with the marginal side edges of the cover plate overlapping the flanges of the beam, and spot welding the marginal side edges of the cover plate to the flanges of the beam while so clamped.

12. In a welding machine, a work holder arranged to receive and hold a channel section beam, means for applying a cover strip to the beam under pressure first over one considerable portion thereof and then over the remaining portion, and means for spot welding the cover strip to the beam from end to end.

13. In a welding machine, a plurality of welding units each having a reciprocable welding electrode and means for reciprocating the electrode, a distributor body having connections respectively to said means, means for supplying motive energy to said body, and a single movable member governing communication between said body and said connections and adapted to travel over said connections successively to operate said units sequentially to place the respective electrodes under pressure against the work, and means for actuating said movable member intermittently, with a dwell at the unit-operating position thereof.

14. In a welding machine, a plurality of welding units each having a cylinder and a piston and a welding electrode operated by fluid pressure in the cylinder, a distributor body having fluid connections to said cylinders respectively, means supplying pressure fluid to said body, a single movable valve member governing communication between said body and said connections and adapted to travel over said connections successively to operate said units sequentially to place the respective electrodes under pressure against the work, and means for actuating said movable member intermittently, with a dwell at the unit-operating position thereof.

15. In a welding machine, a plurality of welding units each having a reciprocable welding electrode and means for reciprocating the electrode, a distributor body having connections respectively to said means, means for supplying motive energy to said body, and a single rotatable member governing communication between said body and said connections and adapted to travel over said connections successively to operate said units sequentially to place the respective electrodes under pressure against the work, and means for actuating said rotatable member intermittently, with a dwell at the unit-operating position thereof.

16. In a welding machine, a plurality of welding units each having a cylinder and a piston and a welding electrode operated by fluid pressure in the cylinder, a distributor body having fluid connections to said cylinders respectively, means supplying pressure fluid to said body, a single rotatable valve member governing communication between said body and said connections and adapted to travel over said connections successively to operate said units sequentially to place the respective electrodes under pressure against the work, and means for actuating said rotatable member intermittently, with a dwell at the unit-operating position thereof.

17. In an automatic welding machine, a plurality of welding electrodes and fluid pressure motors therefor, a distributing valve having distributing ports and operable in different positions to open and close a distributing port connecting a source of working fluid to different said motors, means for intermittently moving said valve from one position to another to quickly connect and disconnect a source of working fluid to and from said different motors, a source of current, means controlling the connection of said source with said electrodes, and means for actuating said control means intermediate the intermittent movement of said distributing valve.

18. In a welding machine, a plurality of electrodes and fluid pressure motors therefor, a distributing valve having distributing ports and operable in different positions to open and close a distributing port connecting a source of working fluid to different said motors, means for rapidly moving said valve from one position to another to quickly connect and disconnect the source of working fluid to and from different motors with a predetermined pause between each movement, a power supply circuit for the electrodes, and means for closing and opening said circuit within the period of time covered by said pauses.

19. In a welding machine, a plurality of electrodes and fluid pressure motors therefor, a distributing valvular means having distributing ports and operable in different positions to open and close a distributing port connecting a source of working fluid to different said motors, means for rapidly moving said valvular means from one position to another to quickly connect and disconnect the source of working fluid to and from different motors with a predetermined pause between each movement, a power supply circuit for the electrodes, and means for closing and opening said circuit within the period of time covered by said pauses.

20. In a welding machine, a plurality of electrodes and fluid pressure motors therefor, valving means for distributing fluid pressure to said motors in succession to successively press the electrodes into work engagement under proper welding pressure, said valving means including means for quickly connecting each motor substantially fully to a source of fluid pressure to quickly impress substantially full fluid pressure on said motor, for maintaining said substantially full pressure in said motor for a dwell period and for thence quickly releasing said pressure, means for applying welding current successively to the electrodes for determinate periods of time within the dwell period.

WILLIAM A. WEIGHTMAN.